Sept. 2, 1924.

O. P. SMITH 1,507,440

HOUSING FOR CONVEYER CARS AND TRACKS

Filed May 24, 1921

Owen P. Smith
By Chester W. Brown
his Attorney

Patented Sept. 2, 1924.

1,507,440

UNITED STATES PATENT OFFICE.

OWEN P. SMITH, OF CHICAGO, ILLINOIS.

HOUSING FOR CONVEYER CARS AND TRACKS.

Application filed May 24, 1921. Serial No. 472,312.

*To all whom it may concern:*

Be it known that I, OWEN P. SMITH, a citizen of the United States, residing at the city of Chicago, in the county of Cook and State of Illinois, have invented certain new and useful Improvements in Housings for Conveyer Cars and Tracks, of which the following is a specification.

My invention relates to means for concealing the track and conveyer car in a mechanical lure conveyer for dog racing courses.

The object of the present invention is to provide a suitable housing for concealing the track and conveyer car from the dogs, and which shall form a continuous housing around the race course, with a continuous opening upon the side toward the course.

Another object is to provide suitable means for supporting the side of the housing toward the track above the opening in said housing.

Figure 1:
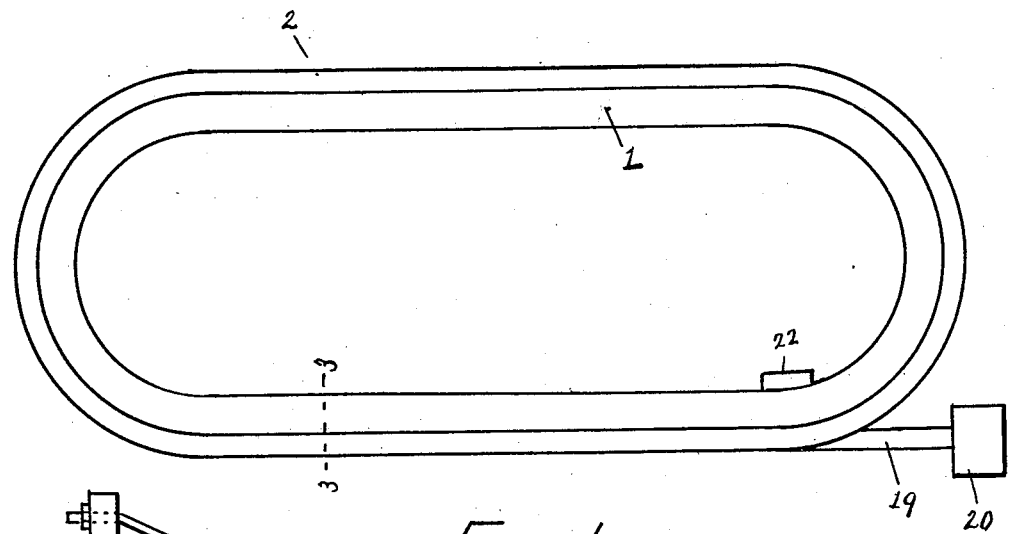

With the foregoing, and other objects in view, my invention consists of the arrangement and combination of parts as hereinafter described and claimed; and while the invention is not restricted to the exact details of the construction disclosed herein, yet, for the purposes of illustrating a particular embodiment thereof, reference is had to the accompanying drawings in which like reference characters designate the same parts in the several views, and in which, Figure 1 is a plan view of a dog racing course having my improved housing arranged thereabout.

Figure 2:
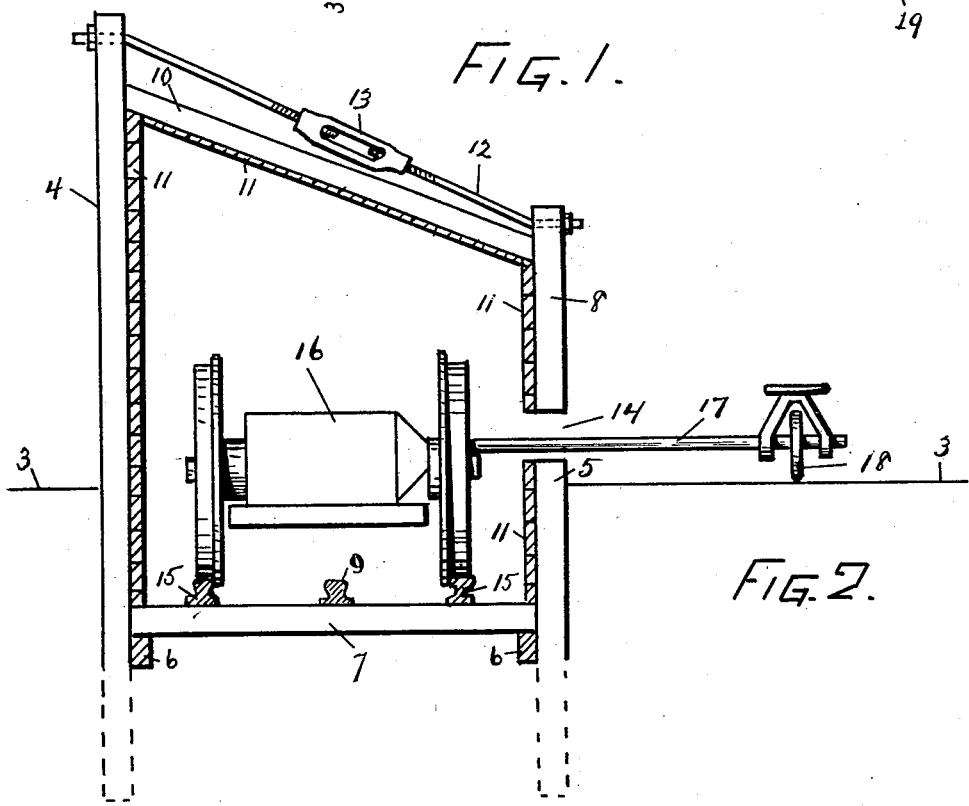

Figure 2 is a sectional view of the housing taken along the line 3—3 in Figure 1.

In the accompanying drawings, 1 represents a race cource suitable for dogs to race upon, having my improved housing 2 installed around the outer circumference thereof. At 19 I have provided a siding and switch suitable for switching the car upon the side track and to the tower and den thereunder 20.

In the installation of my said housing, there is preferably made a slight excavation below the ground line 3. Posts as 4 and 5 are set into the ground at suitable distances apart around the entire course, and these are connected together by the cross ties 7, 7, and the timbers 6, 6. The posts 5, 5 extend slightly above the ground line, while the posts 4, 4 extend above the topmost part of the housing. Rails to form a track as 15, 15 are laid upon the cross ties, and a suitable conductor as 9 also provided for the car. To form the frame work of the inner side and roof, I employ the timbers 8 and 10 respectively, and excepting for a continuous opening 14 on the side toward the race course, the entire interior of the frame work is lined with boards as 11. For supporting the inner edge of the roof, and the inner side of the housing above the opening 14, I have provided truss rods as 12, having one end attached to the upper portion of the posts 4 above the roof, and the other end attached to the upper portion of the timbers 8, with a turnbuckle in between said ends to provide means for adjustment to keep the roof always at the desired elevation.

At 16 I have shown a conveyer car upon said rail track, with an arm 17 extending outwardly toward the middle of the race course, with a traction wheel 18 at the end thereof resting upon the ground. At 22 I have provided the door shown in the side of the housing, which is provided with any suitable catch and release (not shown) for holding said door open during the race, and closing it when the car has passed through it going upon the side track to the den.

In the foregoing construction, it will be seen that the entire track, and conveyer car are concealed from the dogs, the only portions being exposed to view are the arm and parts mounted thereon. When the race is finished, the car is switched upon the siding, and passes through the door 22, which is closed to conceal the entire equipment.

Having thus described my invention, what I claim and desire to secure by Letters Patent, is the following:—

1. In a housing for covering tracks and cars having laterally extending arm operated upon said track, the combination of posts set in the ground at the sides of said track, timbers attached to said posts to form a frame, and boards attached to said timbers and posts to form a continuous enclosure above said track, and having a continuous opening in one side of said housing adapted to permit extension of the laterally extending arm therethrough, and truss rods attached to the closed side of the housing adapted to support the side of said housing above the said continuous opening.

2. In a continuous housing for concealing a rail track and conveyer car having a laterally extending arm, posts on either side of the track, timbers attached to the upper and lower ends of the posts to form a frame, the upper timbers being inclined upwardly, adjustable stay rods connecting the upper ends of the posts to support the inner side wall of the frame, boards attached to the frame to form a covering, one side of the covering having a continuous opening therein through which the arm extends.

3. In a continuous housing for concealing a rail track and conveyer car having a laterally extending arm, base timbers below the ground surface, having rails thereon, posts on each side of the rails, connected to the base timbers and extending upwardly therefrom, the inner post being of less height than the outer post, inclined timbers connecting upper ends of the posts, and screw threaded adjustable stay-rods secured to the upper end of the outer post and supporting the inner post therefrom.

In testimony whereof, I have hereunto set my hand in the presence of two subscribing witnesses.

OWEN P. SMITH.

In presence of—
CHESTER W. BROWN,
RICHARD GREEN.